June 28, 1966 HIROSHI ONO 3,258,215

MINIATURE TAPE RECORDER

Filed Oct. 10, 1963 4 Sheets-Sheet 1

INVENTOR:
HIROSHI ONO
BY Watson D. Harbaugh
ATT'Y

MINIATURE TAPE RECORDER

Filed Oct. 10, 1963 4 Sheets-Sheet 2

INVENTOR:
HIROSHI ONO
BY Watson D. Harbaugh
ATT'Y

June 28, 1966 HIROSHI ONO 3,258,215

MINIATURE TAPE RECORDER

Filed Oct. 10, 1963 4 Sheets-Sheet 3

INVENTOR:
HIROSHI ONO

BY [signature]
ATT'Y

INVENTOR:
HIROSHI ONO
BY
ATT'Y

3,258,215
MINIATURE TAPE RECORDER

Hiroshi Ono, Chicago, Ill., assignor to Webcor, Inc., Chicago, Ill., a corporation of Illinois Filed Oct. 10, 1963, Ser. No. 315,175
23 Claims. (Cl. 242—55.13)

The present invention relates to tape recorders and more particularly to the utilization of plural track invertible readily interchangeable cartridges and the control of tape movement past erase and record heads with a forward traverse for recording and playing back and a rapid rewind traverse for editing, etc.

Associated with this invention are several others: A high speed battery-powered prime mover substantially synchronous in action on a carefully controlled oscillating current of a frequecny of 150 cycles per second having an excellent uniformity of performance is disclosed in application Serial No. 308,242, filed September 11, 1963 for alternating current (A.C.) synchronous-type motor operation. A smooth running 9000 r.p.m. substantially frictionless miniature A.C. motor having no bearing rumble and little, if any, interference noise is disclosed in application Serial No. 315,227, filed of even date herewith. An improved tape reel drive relationship involving a quiet running rubber tread providing exceptionally uniform results is disclosed in application Serial No. 280,063 filed May 13, 1963. Reference is hereby made to these applications and their disclosures incorporated herein.

The present invention is primarily concerned with coordinating the above mentioned inventions and augmenting their results in a shirt pocket miniature tape recorder with an improved, silent, noiseless, non-pulsing transmission between the motor and reel and a control structure and arrangement therefor that is readily adaptable for different operational patterns and which couples the motor to the tape reel of the cartridge with minimum burden on the motor and battery power. The tape recorder can operate in any position under any bodily movement thereof with high efficiency and uniformity of transmission to the reels in or without any recurrent load variations, and provides an excellent environment and movement of magnetic tape across both record and play back heads in recording and reproduction.

In accomplishing these results and advantages, one of the objects of the invention is to provide a self-inducing predetermined constant drive pressure between a hard surface drive capstan or shaft and an elastomer tired driven wheel with the cooperating elements controlled in an improved manner devoid of any appreciable effect of gravity thereon.

Another object of the invention is to provide an improved mechanism for transporting tape directly across magnetic tape heads from the supply reel with a speed reducing transmission having only two driving contacts in which small hard surface capstans contact tensioned elastomer treads, one of which is on the rim of the take-up reel and is under stretch tension. Contact pressures induced or automatically controlled primarily by the torque load transmitted, in which the speed reduction is from approximately 9000 r.p.m. to a uniformly progressively changing tape speed across the magnetic tape head averaging approximately 1.3 inches a second without perceptible "wow" and "flutter."

A further object of the invention is to provide a silent transmission where a small hard shaft depresses an elastomer tire under a constant mild drive pressure of a few thousandths of an inch depression which allows easy production tolerances of one thousandth of an inch in the concentricity and the diameters of the drive and driven elements without any pitch variation, vibration "wow" or "flutter" and with the drive pressure and the friction induced thereby established and maintained to a large extent by the direction of the drive and the torque required during the record or play cycle for constant load conditions well within the capacity of a flea-power, battery driven, A.C. prime mover.

Another object of the invention is to provide an automatic shut-off at the end of the tape which turns off the motor and releases pressure contact at the drive engagements to conserve battery and tread life respectively.

The invention also contemplates a constant mild brake on both reels in both directions and a greater brake effect only in their unwind direction so that when each serves as a tape supply reel the brake differential maintains adequate tape pressure around and against the magnetic heads with minimum frictional drag at the heads. The brake differential also prevents tape snarls under rewind traverse and when the recorder is idle. Furthermore, the brake keeps the tape turns snugly packed on the reel which serves as the element directly drawing the tape across the tape heads. The brake differential is automatically removed from the reel serving as a take-up reel at any one time.

Another object of the invention is to provide an improved operational control which permits manipulation without visual observation wherein a Play or Record operation can be selectively attained by one control when the tape direction control is in its Forward position, and the tape movement can be stopped any time by either control regardless of where the Play and Record control is set yet the tape direction cannot be moved into Rewind from Forward when the switch is in Record position. However, the instrument can be left in a Play setting and the tape direction control can determine a Forward or Rewind movement. These operations can be accomplished without danger of the wrong one of the two controls being improperly actuated and an erasing occurring on Rewind or when play back is desired.

A further object of the invention is to provide an inexpensive, noise free, high fidelity tape recorder limited only by the capabilities of the magnetic heads available, which is easy to handle and operate in any orientation by unskilled users and is easy to service and maintain with unitized components and sub-assemblies and parts.

These being among the objects of the invention, other and further objects and advantages will become apparent from the drawings, the description relating thereto and the appended claims.

FIG. *4a* is a further enlarged sectional view showing the drive relationship between a capstan and a rubber tired driven member.

Figure 5:
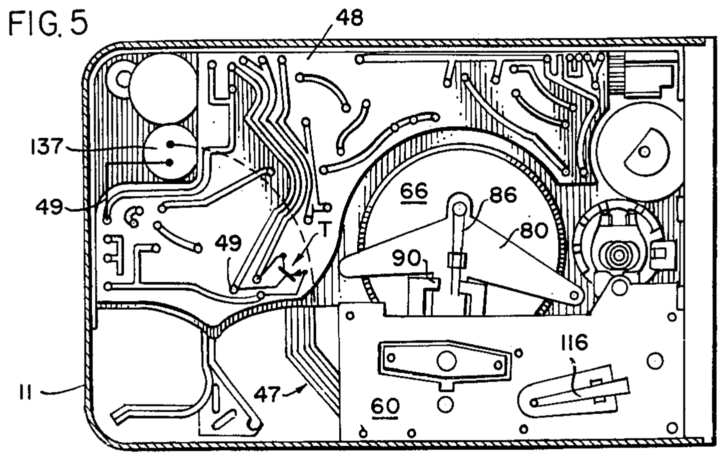

FIG. 5 is a bottom plan view of the main chassis as it appears removed from the case.

Figure 6:
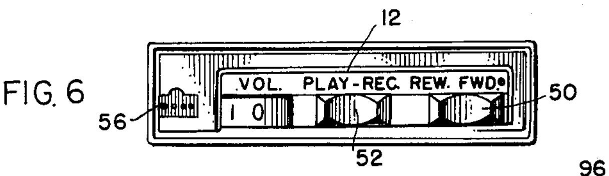

FIG. 6 is an end view in elevation of the control panel formed in the plastic chassis member.

Figures 2, 3, 4, 4A:
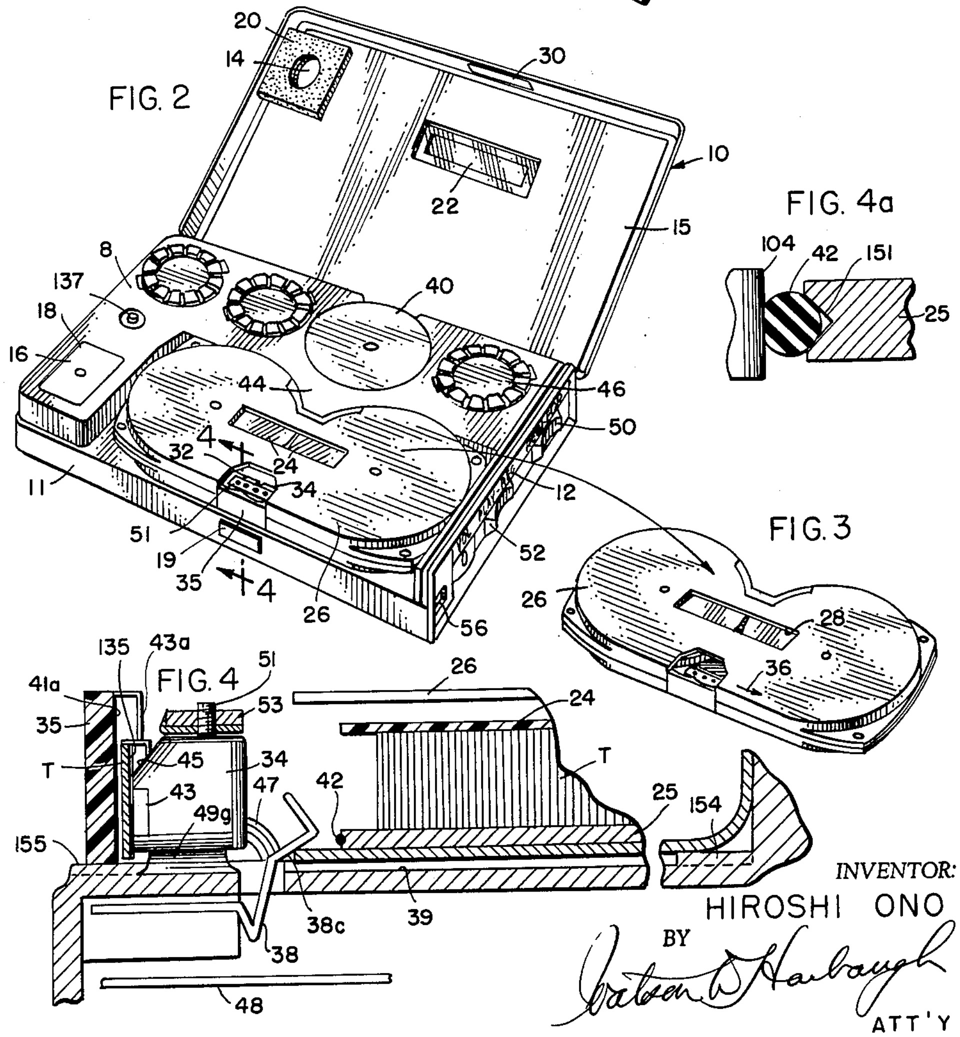
FIG. 2 is a view similar to FIG. 1 with the case opened as it appears to a user with the cartridge exposed ready for inversion or replacement.
FIG. 3 is a perspective view which indicates the structure of the tape package which is removed as a cartridge.
FIG. 4 is an enlarged section taken at the magnetic heads on line 4—4 in showing the cartridge retainer and tape position with respect to a head and the adjustment of the head for the azimuth of the gap between the pole pieces.
Figure 7:
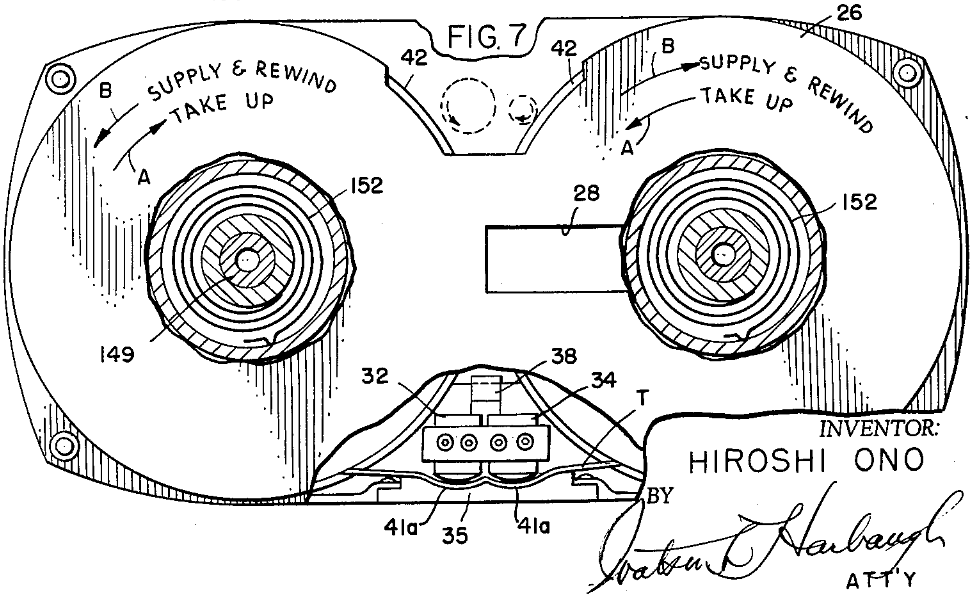

FIG. 7 is an enlarged plan view, partly in section, of the cartridge shown in FIG. 3 identifying relative directions of rotations of the tap reels therein for each reel.

Figure 8:
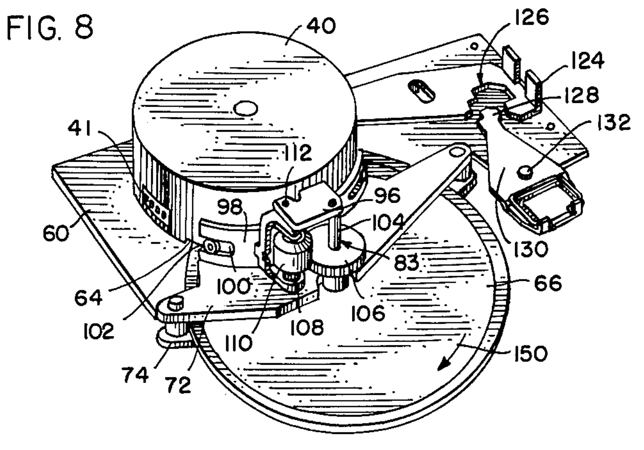

FIG. 8 is a top perspective view of the motor-transmission-control assembly taken from the top of the case with surrounding cooperating elements absent.

Figure 9:
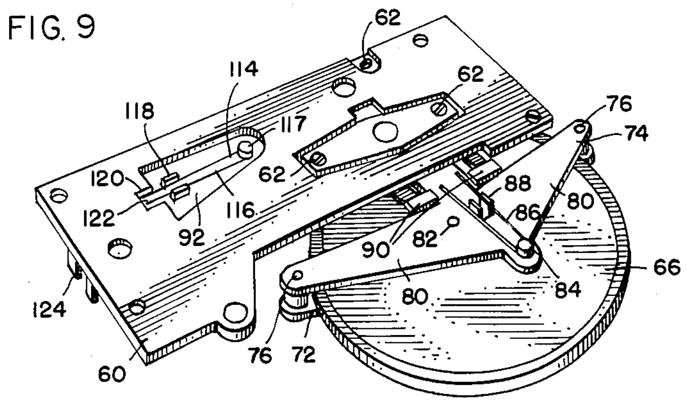

FIG. 9 is a bottom perspective view of the assembly shown in FIG. 8.

Figure 10:
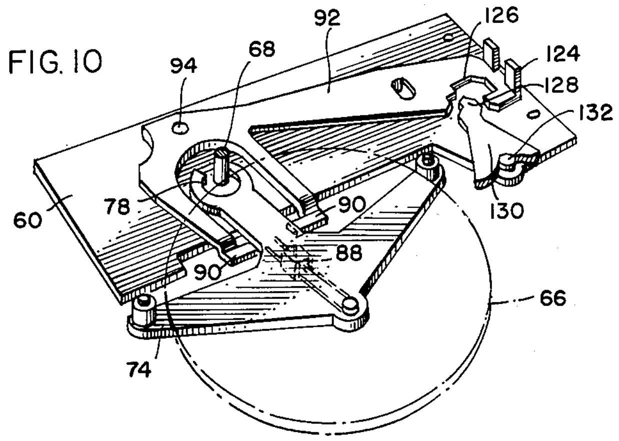

FIG. 10 is a top perspective view of the assembly shown in FIG. 8 with the motor element and part of the transmission shown in phantom.

Figure 11:
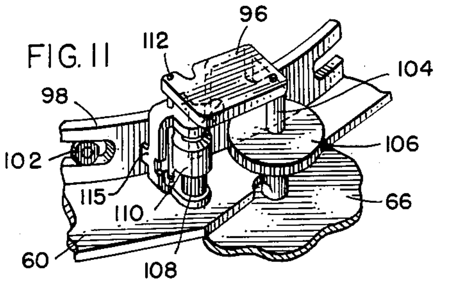

FIG. 11 is an enlarged view of a portion of the transmission as shown in FIG. 8.

Figure 12:
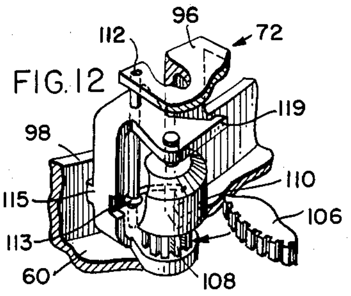

FIG. 12 is a further enlarged partly sectional view of the rewind capstan shown in FIGS. 8 and 11.

Figure 13:
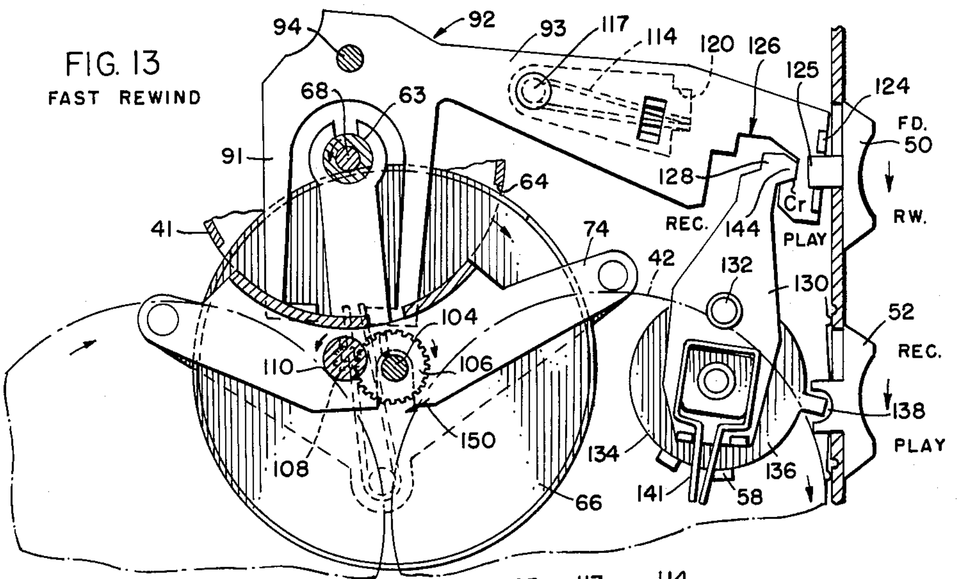
Figures 14, 15:
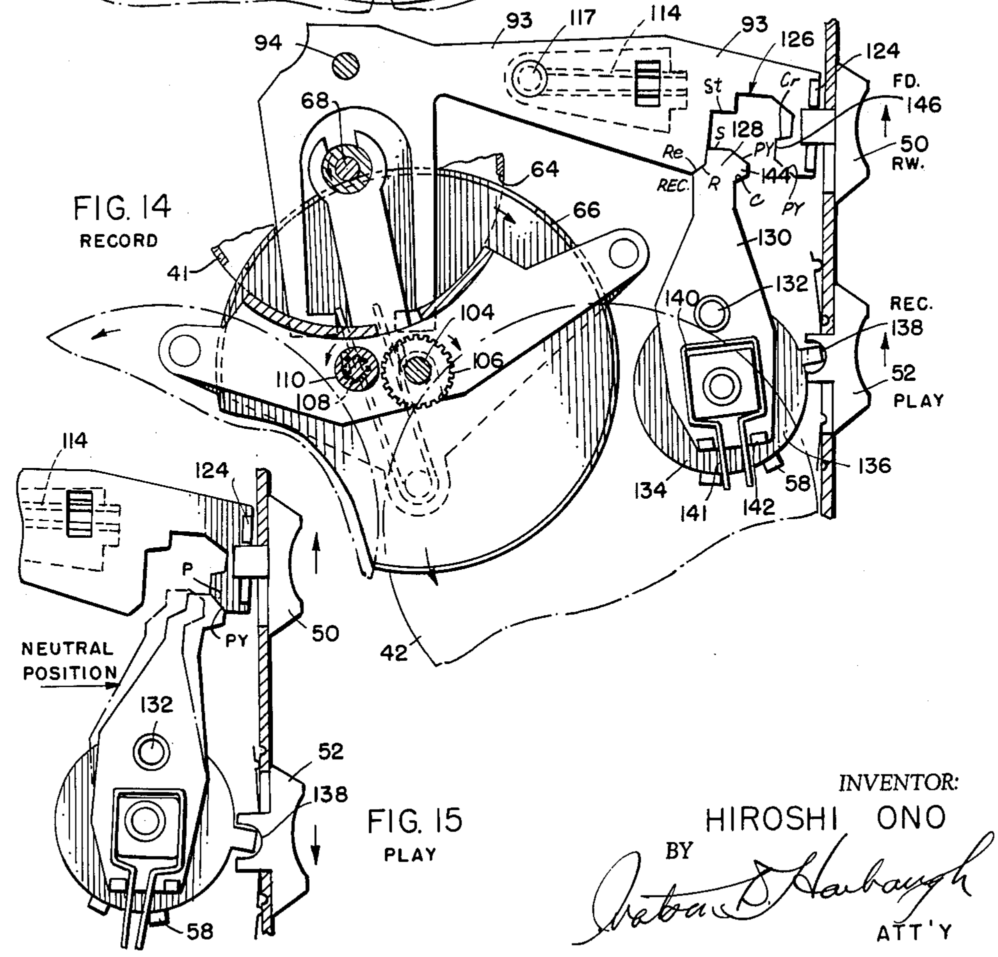

FIGS. 13, 14 and 15 are enlarged top plan views showing the control elements for the motor and transmission in three positions of operation, rewind, record and play respectively.

Figure 1:
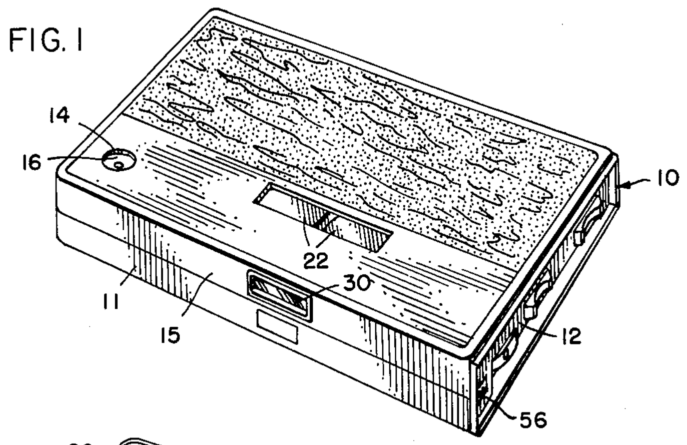
FIG. 1 is a perspective view of the miniature tape recorder embodying the invention with the cartridge in it and the case closed ready for use.

Referring to FIGS. 1 and 2 of the drawings, the outside appearance and orientation of the working parts of the tape recorder are shown wherein a unitized plastic chassis 8 is received in a snap case 10 having a size 5 x 3 x .75 inches. The case receives in the bottom portion 11 thereof a control panel 12 recessed in the chassis at one end, and is provided with a sound portal 14 in an opposite corner in the top 15 of the case for the microphone-speaker element 16 which is enclosed below it in a solid walled well 18 having sponge rubber mountings 20 at the top and bottom. The microphone is thus isolated and removed from all sound or vibration from the controls and case, etc., except that which reaches it circuitously through the portal. The top is snap closed and held closed by a manually releasable spring closed slide latch 19.

A window 22 in the top 15 can span adjacent radii of the two reels 24 that are located in the removable cartridge 26 but preferably only the take-up reel need be shown over an opening 28 in the side of the cartridge to avoid confusion since it is with the recorded portion of the tape that replay and rewind are primarily concerned. Such is involved with the radial depth of tape on the take-up reel. An opening 30 in the front edge of the top 15 reveals through a transparent tape guide 35 on the cartridge the tape T behind the guide and the erase and play magnetic heads 32 and 34, respectively, carried by the case behind the tape T. The tape carried by the cartridge is moved in the direction of arrow 36 (FIG. 3) for forward traverse. Visual inspection through the opening 30 reveals whether the tape is present and properly in place across the heads to indicate whether a cartridge is properly in place. More particularly, it will be observed in FIG. 4 how the cartridge is snapped properly into and held releasably in place by a spring clip 38 carried by the case which urges the cartridge rearwardly into its drive coordinated position.

Symmetrically behind the cartridge in its coordinated position is the motor 40 rated at 9000 r.p.m. with the transmission 42 (FIGS. 8 to 15) driven thereby that is located between it and the reel rims 42 where they are protected beneath an overhanging lip 44 of the chassis. Battery wells closed by bayonet lock covers 46 receive the batteries (not shown) in only one orientation before the covers can be closed to power the recorder.

The electronic circuit for recording and reproducing sound comprises a printed circuit panel 48 of flexible material mounted on the lower side of the chassis next to the bottom of the case where it is not accessible without removing the chassis body. The circuit details of a solid state converter element are not concerned with the present invention aside from noting the base connection 49 of the transistorized first stage of the motor drive converter (application Serial No. 308,242) which to the extent that it is an RC phase shift oscillator of conventional design, when its base B is shorted to ground at 49*g* through normally closed switch 137, such biases the transistor T (FIG. 5) to a non-conductive state and thereby shuts off the flow of power to the motor.

The control panel 12 has two three position buttons 50 and 52, a Volume control 54 and a multiple conductor jack receptacle 56 for remote electrical control. The two slide buttons are the forward and reverse control 50 for the transmission and in the description to follow "Forward" or "Fwd" will indicate the position of parts as controlled by button 50 for that operation and "Rewind" or "Rwd" will refer to the parts as controlled in this position in which reverse movement of the tape occurs at an 8 to 1 faster speed and lower ratio than that present for forward movement. Reference to "Play" or "Record" will indicate the position of button 52 and controlled parts and components when not in the center or "Off" position. "Play" also indicates that the erase head 32 is not being energized for recording purpose. This button 52 controls a multi-pole complex arrangement for switching electrical components for the purposes intended and in connection therewith carries a mechanical actuating element or yoke 58 (FIGS. 13–15). In view of the fact that the transmission and its components are located on both sides of a carrier plate 60, the above legends are incorporated in the drawings for the sake of clarity.

Referring to FIGS. 8–10, it will be observed that the motor 40 is mounted on the top face of the plate 60 by screws 62. As more particularly described in application Serial No. 315,227 the bearings (not shown) are supported on the end walls of a cylindrical motor housing in bosses 63 (FIG. 13) with a portion of the cylindrical wall 41 apertured as at 64 to permit a rubber tired secondary wheel 66 to run against the shaft 68 of the motor armature as a capstan located between the motor bearings.

The cylindrical wall 41 of the housing is concentric with the shaft 68 and the secondary wheel 66 is loosely mounted thereon for limited arcuate movement and radial movement. This is accomplished by a frame 70 comprising two laterally spaced members 72 and 74 riveted together at 76 to encompass and journal the wheel 66.

The lower member 74 is generally T-shaped and flat on the wheel side with the foot of the T rounded at 78 to be journalled loosely against the circular bearing boss 63 of the motor housing as supported against axial displacement by and between the adjacent end wall of the motor housing and the plate 60. The arms 80 of the T-member 74 extend beyond and clear the edge of the secondary wheel 66. Centrally on the T-member the wheel shaft 83 is journalled at 82 and therebeyond is provided with a rivet 84 which rigidly secures the reverse bend of a parallel armed wire spring 86 employed to urge the secondary wheel resiliently to a controlled position. To do this, the divergently urged spring arms are confined between spaced upturned ears 88 and extend therebeyond to be engaged by equally spaced fingers 90 on the arm of a control lever 92, further described later, pivotally mounted on the plate 60 at 94 (FIG. 10). Thus, when moved in one direction one of the fingers deflects one spring arm 86 and frees the other to thereby urge the T element and with it the journal 82 in the same direction of movement. Movement can be in either direction. Radial movement of the wheel 66 is not disturbed and no parts are strained. Such an arrangement is referred to as a yoke spring centering device.

On the other side of the wheel 66 the frame member 72 (FIG. 8) has an upstanding and reversely bent arm 96 journalling the other end of the wheel shaft 83 with wings 98 on the upstanding portion following the cylindrical contour of the motor housing. Their ends are notched at 100 to straddle and be guided thereon by cylindrical rollers 102 in a relation supporting the frame in its movement just described without interfering with radial movement of the frame 72.

The shaft 83 includes a capstan portion 104 (FIG. 11) to engage a reel rim 42 in Forward position and a large gear 106 therebelow. A U-shaped bracket journalling a smaller gear 108 and a larger capstan 110 is pivotally mounted at 112 between the arm 96 and body of the frame member 72. For quiet running at all times a light torque spring 113 urges separation of the gears as limited by stop 115 on "Forward" and a stop 119 limits the depth of gear engagement on "Play" when the capstan 110 engages the rim of the wheel for Rewind.

The lever 92 in turn is yoke spring centered also, it being observed in FIG. 9 that the bend 114 of a U-shaped wire spring 116 is secured to the other arm 93 of lever 92 by a rivet 117 and the ends thereof pass between spaced upturned ears 118 on the lever to terminally engage equally spaced shoulders 120 of a notch 122 in the plate 60 located remote from the pivotal mounting 94. Thus, if the lever 92 is free of restraint it will be urged to a neutral position and along with it the frame assembly 74 and capstans 104 and 110. But, if moved in either direction, one or the other of the capstans engages one or the other one of the rims 42 of reels 24.

Arm 93 of lever 92 terminates in upturned ears forming a yoke 124 (FIGS. 8, 13–15) which bridges a boss 126 on the three position Forward and Rewind control 50. When the control is moved to Forward position (FIG. 14) capstan 104 engages the rim of that reel which is serving as the "take-up" reel whereas in the Rewind position (FIG. 13) the capstan 110 engages that reel which is serving as the supply reel for it to rewind tape from the take-up reel.

The operation of the lever 92 is coordinated with the "Record-Play" slider 52 by means of cams and interlock contours or elements formed in the margins of a notch 126 stamped out in one edge of the arm 93 and a reciprocable head 128 on element 130. As noted in FIGS. 13–15, the contours on the left side of the notch 126 are related to recording (FIG. 14) while those on the right side are related to playing (FIGS. 13 and 15) in combination with alternate positions of the head 128 with respect thereto.

For this cooperation the lever 130 is pivotally mounted at 132 on the plate 60 (FIG. 8) in back of a three position rotary switch body 134 whose armature 136 is provided with a similar yoke interengagement at 138 with the "Record-Play" control 52. The armature 136 and lever 130 are also provided with a yoke spring centering arrangement in which a U-shaped spring 140 is secured to the lever 130 and has divergingly urged legs extending between and beyond upturned ears 142 on the end of the lever to terminally engage the upturned equally spaced ears 58 on the armature 136. Movement of the armature flexes one leg of the spring and frees the other to have the lever urged to follow movement of the armature. Thus, with movement of the switch armature from a center position the head 128 is urged to cooperate with either one side of the notch 126 or the other and is yieldingly urged to hold such cooperation as long as the switch armature retains its imposed position.

In describing this cooperation it will be noted that the particular arrangement of elements lends itself to different programming with mere slight change of contours of cam, latch and stop elements either as original equipment changes or service modifications for special purposes after sale. However, these elements will be described at this time with their contours and functions oriented as shown and with the movement of the arm 93 in a direction radial to the pivotal movement of the lever 130 and the head 128 in a direction radial to the pivoted movement of the arm 93.

In FIG. 14 where the parts are set for "Record" the back or left side of the head 128 is provided with an outwardly facing cam incline R mating with a corresponding incline Re on the arm 93 for rewind purposes. The depth of these cams is enough that commanding movement of the Fd–Rw button 50 to its neutral position will return the switch armature 136 to neutral position with it preferably still urged to assume the Re-R cam engagement when free to do so. Since the effort to move the control 50 to neutral might end in an over movement of the control 50, the length of the cam R and Re are less than the length of the stop St on the arm 93 so that the stop corner S on the lever 130 will engage same and prevent the overmovement without the Rec-Play control 52 being intentionally moved from its urged Record position. Thus, the danger of erasing a recording on tape Rewind is obviated. If further movement of control 50 is desired, the control 52 is moved to neutral whereupon the stops S and St will clear one another and the cam R engaging stop St will cam the nose 144 of head 128 to a position behind the boss 146 in which position a cam C on the bottom side thereof engages a mating cam Cr on the arm 93. This is the position shown in FIG. 13 which will be further described shortly.

In the event the user desires to change quickly from Record to Play and vice versa without stopping the forward movement of the tape, the Record-Play control 52 can be reversed in position from that shown in FIG. 13 to that shown in FIG. 15 in which a cam P on top of the nose 144 moves into engagement with cam Pl below the limit boss 146. Thus, with the control 50 in Forward position the switch control 52 can instantly be moved into either one and then to the other of its two positions, Record or Play. This permits a review play back and immediate resumption of a recording.

Either can be terminated by movement of the control 52 back to neutral. Furthermore, when reviewing a recording for a particular item, if the controls are set for Forward and Play, movement from Play to Rewind can be manually accomplished by moving the slider 50 alone. The head yields to the cams Cr and P*l* and lever 130 returns to Play position by spring 141 action.

The motor 40 is turned on by control 52 of switch 134 as the lever 130 is moved to either its Record or Play positions and because of the quick action of the two levers the motor is kept running while control 50 is going from either one of its two positions to the third position, namely, Rewind. It is only when Rewind is terminated that the lever 130 and switch 134 are returned to the neutral motor "Off" position, and, in this connection it should be noted that the motor and the circuit can be both be turned "Off" also when either end of the tape is reached on the reels.

This automatic shut-off can be accomplished by a leaf switch at the core of the take-up reel being held closed in the motor circuit by the inner turns of the tape as connected in series with the switch 134 in Play position to turn off on Rewind, with a like switch on the other reel in series with the Record position of switch 134. However, it is preferred to have a terminal portion of the tape made conductive or provided with a silver strip 135 (FIG. 4) to bridge the poles of the two heads 32 and 34 to terminate operation because it lends itself to other short conductive contacts being placed on the tape for other automatic shut-off points. As already mentioned, this bridging is connected to ground the base 49 of the first stage of the motor drive converter to stop current flow to the motor.

In order to override the automatic shut-off two things can occur. With the motor shut off the cartridge is ready for inversion. Removal of the cartridge removes the bridge and the motor resumes operation and since the controls are presumably in the same position such as Play, Record, or Rewind, the moment that the rim of the reel of the cartridge being returned engages the capstan, the tape begins to move in the direction that removes the conductive bridge 135 from the vicinity of the heads. If a moment is provided for this to occur just before the cartridge is snapped down in place, the conductive strip will be removed from its bridging position and the motor will continue to run after the cartridge is snapped down into its working position with the spring latch 38 urging the reel rim into final working contact with the capstan.

In order to provide a safeguard alternative to users unmindful of this relationship, an overriding normally closed switch in series with the pole pieces is located at 137 (FIG. 2) which is pressed momentarily to break the short until the conductive strip 135 clears the heads for resumed recorder operation.

Referring again to FIG. 13, the rewind is the one function which can be started by actuation of one control alone, namely, control 50, and a shut-off can be attained by either control being moved to its neutral position. However, it should be noted that the switch armature 136 is provided with a pair of position spring detents represented at 148 which serve to retain the lever 130 in all three positions with two detents being engaged in the neutral position. The retention is enough to provide tactual perception for the user and the cams R, C and P are of a moderate incline so that the lever 130 operates as a latch upon arm 93 for all three engagement positions represented by them. But the latch effort is one which can be overridden by reasonable manual effort exerted upon control 50 in conjunction with the U springs 141 and 114. The latter spring assists a return to neutral since one of its supports 120 is stationary. In event any other pattern or sequence of control is desired for the two controls 50 and 52, any one or all of the cams can be squared to prevent override. Such can be done in the stamping die or filed off by a mechanic for special applications. The design lends itself to modification as well as providing a novel pattern as described.

Considering again to the fact that arm 93, yoke 91 and T member 74 all return to a neutral position when the Play-Record arm 130 is in neutral position, reference is now made to FIGS. 7, 11 and 12 along with 13 and 14 because the secondary wheel 66 and capstan assembly not only is relieved of engagement with the rubber tired rims 42 of both reels 24, but the rubber tired wheel 66 moves or drops away from compressive engagement with the motor shaft 68 when idle.

The rubber tired arrangement disclosed involves several other relationships which should now be described. The reels preferably are made of aluminum with one side 25 and the hub elements 149 (FIG. 7) integral. The outer hub portion is recessed to support the other side 26 which is made of transparent plastic to reveal the number of tape turns on the reel as already described. The rim of the side 25 is .004 inch thick and a 90° V-groove 151 is machined therein (FIG. 4*a*) with cylindrical marginal contours approximately .010 inch wide. A solid tread 42 of an elastomer material is disposed therein having a Durometer reading of 80 and a diameter rating permitting without deterioration a 25% stretch elongation. Although the cross-sectional contour of the tread may be of other shapes, it preferably is round (FIG. 4*a*) to present a convex surface of revolution to the cylindrical capstan 104, thus permitting the tread to be engaged along three lines, namely, the two sides of the V-groove and the capstan with open space over its remaining surface areas into which it can flow and wedge under drive depression for maximum drive efficiency.

The circumference of the tread 42 is approximately 20% less than the circumference of the wheel 25 with the result that when installed the elastomer material is under substantial circumferential stretch tension when engaged by the capstan. This provides for a rolling contact depressing the tread radially without placing any elastomer molecules under compression and this is the minimum criterion of how much stretch is to be imposed upon the tread. Accordingly, there is no wave of compressed elastomer ahead of the capstan to cause rotary drive variations. Moreover, room is provided in the V-groove inside the inner surface of the tread which permits the outer surface to yield more deeply for good drive engagement without appreciably increasing frictional drag, the tension favoring the yield rather than encountering a compression opposing it. The greater effort expended in depressing a stretched elastomer is one of self recovery which does not affect the drive materially as compared with a compression load wave continually opposing the capstan where the tread is not stretched. At high capstan speeds this is particularly significant. In brief, the resulting load involved with the drive depression on the tread is in the direction that the molecules want to go under stretch conditions rather than against the efforts of the capstan under unstretched conditions.

It will also be appreciated that new treads can be supplied any time and be completely uniform in shape and performance with little service cost. Also a tread sectional diameter of .030 inch with the rim as constructed stretched in excess of 10% of its length and not materially more than 20% eliminates all perceptible "wow" and "flutter" in a recording and greatly reduces the expected frictional drive load on the transmission. Both the wheel 66 and one side 25 of each reel can be so equipped.

In this connection it is to be noted that the "Forward" capstan engages the elastomer rimmed side 25 of a reel while the "Rewind" capstan engages the edge of the plastic side 24 of the reel. The rewind contact between a metal and hard plastic has substantially no frictional drag and uniformity of speed is not required.

It will be observed again that the T-member 74 is journalled on the motor housing bearing boss by the yoke 78 with freedom for limited radial movement. Its inward radial movement is held to .004 inch, plus or minus .001 inch, under the radius of the wheel 66 so that under drive conditions there is a tire compression interference on wheel 66 of from .003 to .005 of an inch when either capstan is driving a reel. When neither the motor shaft nor one of the capstans is driving a reel, even though they be non-rotatively in contact with rubber rims, they are free to disengage. Consequently, even though the machine is turned off without the lever 93 being returned to neutral there will be no pressure remaining at the drive contact sufficient to leave an indentation or flat spot in the tread.

In accomplishing this the axis of the capstan geometrically is at the apex of a triangle whose other corners are the axes of the motor shaft and the reel engaged with the adjacent legs thereof defining approximately a 135° angle between them, or an angle of 45°. The angle is small enough that the elements can disengage easily when not rotating yet large enough that with rotation af the capstan in the direction shown by arrow 150 (FIGS. 8 and 13) the capstan tends to turn itself into the triangle with a toggle action which places the rubber tired rims 42 under the depression described with the depth of depression increasing as the torque load gradually increases with the tape turns building up on the take-up reel and the tape turns diminishing on the supply reel. This arrangement greatly reduces the number of parts normally required to accomplish a loaded drive contact automatically induced upon a drive engagement and a non-loaded contact or separation between the motor shaft and rubber rimmed wheel 66 when idle. Same also enables a direct drive to the take-up reel under conditions favorable to excellent performance of a tape recorder.

The angle of incidence is approximately the same for the rewind capstan 110 when it is brought into engagement with the supply reel rim to rewind all or a portion of the tape thereon as may be desired. As already mentioned the capstan 104 carries the large gear 106 which is engaged by the small gear 108 when the capstan 110 (FIG. 11) is moved into engagement with the supply reel, as when the control 50 is moved to Rewind position. Here again the capstan pinches or turns into the triangulation toggle to develop pressure contact forces on the drive engagement (FIG. 12) which forces likewise are beneficially discarded when motor rotation or drive contact ceases whereupon the gears naturally separate to remove the load of the reversing shaft on the capstan 104 member when the capstan 104 is moved to idle or Play position.

One of the many advantages of this arrangement is that wide tolerance variations between tape cartridge positions when snapped into place are minimized to an insignificance in so far as the transmission and its drive are concerned and with the latch spring 38 urging the cartridge in a direction withstanding the drive pressure constancy of transmission and speed are assured at all times.

The latch spring 38 also locates the cartridge on a three point support for tape orientation with respect to the heads 32 and 34 by providing a downwardly directed component of force as seen in FIG. 4. In accomplishing this, two spaced rests or bosses 154 are located on the floor of the recess 39 receiving the cartridge at the rear thereof. One is located under each reel perimeter and the third boss 155 is located to be engaged by the transparent element 54 in front of the heads 32 and 34 with the spring latch 38 having an incline portion 38*c* camming the cartridge downwardly at a point within the triangle defined by the three point support.

It will be observed that the inner surface of the transparent element 35 is concavely rounded at 41*a* around each head face to provide raised elements 43*a* that displace the tape T to wrap it around the poles 43 of the heads so that under transport tension on the tape the coated side of the tape T is brought into intimate pressure contact with the pole pieces. When the cartridge is not in place in the recorder, the tape extends straight across the concavities and rests on the raised elements consequently the upper front edges of the pole pieces are beveled as at 45 to move the tape into its sinuous working position as the cartridge is moved into place held by the spring 38. Furthermore, the spring 38 serves to protect the connection wires 47 for the heads when the cartridge is absent.

The bottoms of the heads 32 and 34 are each supported at its center on a rib 49 extending perpendicular to the path of tape movement and each head pivots laterally thereon as adjustably supported at the top by spaced screws 51 carried by a bracket 53 which encompasses the heads. Thus, the azimuth of the pole pieces and gap can be adjusted to any extent required to conform all tape recorders upon which cartridges may be interchangeably used.

As shown in FIG. 7 helical ribbon springs 152 are wrapped in the direction of tape build-up when the reels are turned in a direction (FIG. 7) to impose frictional drag upon the unwinding spool yet free the reel from such drag when the reel is turning in the opposite direction B for the respective reels. This relation is maintained when the tape cartridge 26 is inverted for the second tone track operation.

Having thus described the invention its preferred embodiments and its operational characteristics and novel results attained, it will be apparent to those skilled in the art how the objects and purposes of the invention and the excellent results for a miniature tape recorder are attained, and also how associated elements and changes, for reasons well known in the art of the tape recording, can be incorporated or made without departing from the spirit of the invention the scope of which is commensurate with the appended claims.

What is claimed is:

1. In a tape recorder having a supply reel and a take-up reel, a motor driven capstan means, control means for moving said capstan means alternately into drive engagement with said reels including a two position member, said member having two spaced cam elements, means for electrically energizing said motor and the tape recorder alternately for play and record including two spaced cams cooperating with the cam elements alternately in separate pairs therewith, said elements and cams being movable with respect to one another in cross directions, resilient means urging said cams into engagement with said elements, and for moving said two position lever between said two positions and said capstan means between said alternate positions, said movement of the lever moving said energizing means in said cross direction to relinquish contact of one cam and element to establish contact between the other cam and element.

2. In a tape recorder having a supply reel and a take-up reel, a motor driven capstan means, control means for moving said capstan means into alternate drive engagement with said reels including a member having two working positions and a neutral position, said member having two oppositely facing spaced cam elements, means for electrically energizing said motor and the tape recorder alternately for play and record including two spaced cams cooperating with the first cam elements in mating pairs, said elements and cams being movable with respect to one another in cross directions from mutually neutral positions, resilient means normally urging said cams and cam elements to their neutral positions, means for actuating said resilient means for urging said cams into engagement with said cam elements, and means actuating said control means for determining which pair of cams and cam elements engage.

3. A tape recorder comprising a motor shaft rotating constantly in one direction, an elastomer rimmed wheel movable into pressure contact with said motor shaft, a capstan means carried by said wheel, a take-up tape reel having an elastomer tired rim, a supply reel engaged by said capstan means for rewinding tape from the take-up reel, said tape reels and capstan means being movable into engagement with respect to each other, resilient control means for moving said capstan means into alternate resilient drive engagement with said reels including a multiple position member, said member having two spaced cam elements, means for electrically energizing said motor and the tape recorder alternately for play and record including an element having two spaced cams cooperating with the cam elements alternately in separately mating pairs therewith, said cam elements and cams being movable separately with respect to one another into and out of one mating engagement to another, and resilient means urging said cams into engagement with said cam elements.

4. The combination called for in claim 3 in which the axis of said capstan means defines the apex of an obtuse angle of a triangle whose other corners are the axes of said motor shaft and the reel engaged, said capstan means and reel rotating in the direction of the triangle at their point of engagement to force said wheel into pressure contact with said motor shaft.

5. In a tape recorder having a supply reel and a take-up reel, a motor having a housing, an armature journalled in the housing at the ends of the armature, a shaft on the armature defining a capstan surface at one end of the armature, a secondary wheel for engaging the capstan surface in driven relationship, a support journalling said wheel and pivotally mounted on the housing coaxially with said capstan surface, a secondary capstan carried by said secondary wheel for engaging the rim of the take-up reel, the axes of said capstan surface, said secondary capstan and take-up reel defining a triangle having an obtuse angle at said secondary capstan axis with the direction of drive thereof away from said triangle to impose drive pressure contact between said capstan surface and said secondary wheel, and resilient tread means carried on the rims of said wheel and take-up reel, said support limiting movement of said secondary wheel to an engagement of only several thousandths of an inch less than the radius of said wheel.

6. In a tape recorder having a supply reel and a take-up reel, a motor having a housing, an armature journalled on the housing at its ends and having a shaft intermediate its ends defining a capstan surface, a secondary wheel for engaging the capstan surface in driven relationship, a support journalling said wheel pivotally mounted on the housing movable to place the wheel in engagement with said capstan surface, torque transmitting means carried by said wheel for contacting the take-up reel in drive relationship, the axes of said shaft, secondary wheel and take-up reel defining a triangle having an obtuse angle at said secondary wheel axis with drive relationship with the movement thereof in a direction away from said triangle to impose drive pressure contact at said drive relationship and between said capstan surface and secondary wheel.

7. In a tape recorder having a supply reel and a take-up reel, a motor having a housing, an armature, means for journalling the armature in the housing including bearings on the housing at the ends of the armature, a drive surface on the armature at one end of the armature intermediate the bearings, a secondary wheel for engaging the drive surface in driven relationship, a support journalling said wheel pivotally mounted on the housing adjacent said one end of the armature, torque transmitting means driven by said secondary wheel for rotating the take-up reel, the axes of said armature, secondary wheel and take-up reel defining a triangle having an obtuse angle at said secondary wheel axis with said drive engagement moving in a direction away from said triangle to impose drive pressure contact between said drive surface and secondary wheel.

8. In a miniature tape recorder having a housing, a prime mover journalled therein and a magnetic head, a speed reduction transmission having two driving outputs of different reduction ratios and different direction of rotation, means for disconnecting the output having the lesser ratio from the transmission train when not working, a tape cartridge including a pair of tape reels both including a resiliently tired rim edge but running in spaced planes, means for alternately engaging the reel rims disposed in the same plane on the same side of the cartridge with said driving outputs, magnetic tape terminally mounted on said reels in opposite directions of rotation, friction means upon each reel effective to brake each reel upon rotation thereof opposite to the direction at which tape is wound upon such reel to maintain a predetermined tension on the tape portion interconnecting the reels for movement in a predetermined path, a magnetic head carried by said housing and disposed adjacent to said path, and means carried by said cartridge deflecting said tape portion into pressure contact with said head.

9. The combination called for in claim 8 in which said means for alternately engaging the reel rims includes a two position member, said member having two spaced cam elements, means for electrically energizing said prime mover and the tape recorder alternately for play and record including two spaced cams cooperating with the cam elements alternately in separate pairs therewith, said cam elements and cams being movable with respect to one another, resilient means urging said cams into engagement with said cam elements.

10. A tape recorder comprising a motor shaft rotating constantly in one direction, an elastomer rimmed wheel movable into pressure contact with said motor shaft, a capstan carried by said wheel, a tape reel having an elastomer tired rim, said tape reel and capstan being movable into engagement with respect to each other, the axis of said capstan defining the apex of an obtuse angle of a triangle whose other corners are the axes of said motor shaft and said reel, said capstan and wheel rotating in the direction of the triangle at their point of engagement to force said wheel into pressure contact with said motor shaft and spring means urging said capstan into contact with said elastomer tired rim.

11. A tape recorder comprising a driving shaft rotating constantly in one direction defining a capstan, a tape take-up reel drive including a wheel having a V-groove in the peripheral edge of said wheel, a tread disposed in said V-groove under stretch tension, and being movable into pressure contact with said capstan, and releasable resilient means urging said wheel and capstan into rolling drive relationship.

12. In a tape recorder having a removable tape cartridge with two reels in it disposed side by side, said cartridge following the general contour of the reels, a magnetic head received through the wall of said cartridge between reels with the tape interconnecting the reels extending across the head and directly to said reels, one of said reels serving as a take-up reel while the other one serves as a supply reel, an elastomer tread upon one rim of each reel, said tread being under elongation tension, a torque transmission means including a drive capstan engaging said tread within the contour of said cartridge under a pressure having force components radial and chordal to the take-up reel, said tension being great enough that pressure contact with said tread by said capstan fails to place any of the elastomer under compression, means for moving said capstan in and out of contact with said tread, and means for driving said capstan at a uniform speed.

13. The combination called for in claim 12 in which said transmission means includes a gear driven from said drive capstan, a second capstan driven by said gear for engaging the rim of said supply reel for rewinding the tape, and said capstan moving means includes a lever for moving said transmission means between said reels selectively alternately.

14. In a tape recorder having a removable tape cartridge comprising a flat elongated housing with two reels journalled therein in edge to edge relationship, a magnetic head received between reels within the contour of the housing, a transparent element carried by said cartridge in front of said head with the tape extending across the head and directly to said reels, one of said reels serving as a take-up reel while the other one serves as a supply reel, said transparent element having a contour following that of the head for holding the tape against said head, an elastomer tread upon one rim of each reel, said tread being under elongation tension, a torque transmission means including a capstan resiliently engaging said tread under pressure, spring means for releasably urging said cartridge and reels towards said transmission means, said tension being great enough that pressure contact with said tread by said capstan fails to place any of the elastomer under compression, mean for moving said capstan in and out of contact with said tread, and means for driving said capstan at a uniform speed.

15. In a tape recorder having a removable tape cartridge with two reels in it disposed side by side, said cartridge following the general contour of the reels, a magnetic head received through the wall of said cartridge between reels with the tape interconnecting the reels extending across the head and directly to said reels, one of said reels serving as a take-up reel while the other one serves as a supply reel, an elastomer tread upon one rim of each reel, said tread being under elongation tension, a torque transmission means including a drive capstan engaging said tread within the contour of said cartridge under a pressure having force components radial and chordal to the take-up reel, said tension being great enough that pressure contact with said tread by said capstan fails to place any of the elastomer under compression, mean for moving said capstan in and out of contact with said tread, and means for driving said capstan at a uniform speed, said means for moving said capstan comprising a multi-position lever, resilient means controlled by said lever to urged said capstan into contact with said tread, and said means for driving said capstan including a rubber tired wheel for carrying said capstan and a motor capstan resiliently engaging said rubber tired wheel when said cartridge is in operative position.

16. In a tape recording having an invertible replaceable tape cartridge with two reels disposed side by side, a magnetic head between the reels with the tape on the reels extending across the head and directly to said reels for transport across the head when the reels rotate in the same direction, one of said reels serving as a take-up reel while the other one is serving as a supply reel, undirectional differential brake means effective upon both reels when said reels rotate oppositely in directions loosening the tape between them, an elastomer tread upon one rim of each reel, said tread being under elongation tension, a torque transmission means including a capstan engaging said tread under pressure having force components radial and chordal to the take-up reel, said tension being great enough that pressure contact with said tread by said capstan fails to place any of the elastomer under compression, means for moving said capstan in and out of contact with the tread of the take-up reel when said cartridge is in one of its operative positions, means for driving said capstan at a uniform speed, and releasable means holding said cartridge in operative position against displacement by said capstan contact.

17. The combination called for in claim 16 in which said transmission means includes a counter shaft driven from said capstan, a capstan on the counter shaft for engaging a rim of said supply reel for rewinding the tape, said capstan moving means including a lever for moving said transmission means alternately between said capstan-to-reel contacts.

18. In a tape recording having an invertible replaceable cartridge with two reels disposed side by side one serving as a take-up reel at any given time, a tape terminally wound on said reels having electrically conductive elements adjacent to its ends, a motor drive for said reels engaged when said cartridge in its operative position, a power source for said motor drive including a solid state current-converter element having a base connection in the first stage, spaced contacts adapted to be bridged by either one of said conductive elements disposed in a circuit which includes the base of said first stage and a ground connection, and a normally closed manual switch connected in series therewith, said cartridge carrying said reels being removable from an operative position for removing said conductive element from said contact bridging relationship.

19. The combination called for in claim 18 in which said contacts include record and play back heads, a transmission means urged into drive engagement with said take-up reel, said removal of the cartridge removing said conductive element from contact with said heads in a direction normal to said tape for inversion and return of the cartridge to operative position, said reels engaging said transmission means sequentially before said tape engages said heads.

20. In a tape recorder having a supply reel and a take-up reel, a motor having an armature and a housing journalling the ends of the armature, capstan means on said armature intermediate its ends, said housing having cylindrical wall portions concentric with said armature on opposite sides of said capstan means, speed reduction transmission means including a wheel driven by said capstan means, means on said cylindrical wall portions journalling said wheel for bodily movement pivotally about the axis of said capstan means, and resilient selectively controlled means for moving said transmission means into drive engagement with said reels alternately, the portion of the reel engaged that is closest to the capstan means being rotated in each instance towards said drive engagement.

21. The combination called for in claim 20 in which said transmission means has a capstan for engaging the take-up reel and a reversing gear having a capstan for engaging the supply reel, speed increasing gear means interconnecting said capstan and supply reel, and means for supporting said reversing gear for free movement of the gear means into and out of engagement with each other.

22. In a tape recording having an invertible cartridge with a supply reel and a take-up reel carrying a tape having electrically conductive elements adjacent to its ends, a motor and transmission drive for driving said reels selectively, a power source for said motor including a current converter with a solid state element having a base connection in the first stage, spaced contacts bridged by said element disposed in a circuit of said current converter which includes the base of said first stage and a ground connection, and a normally closed manual switch connected in series therewith, said cartridge carrying said reels and tape being removable for removing said conductive element from said contact bridging relationship to re-energize the motor, and said reels reenergizing said drive sequentially before said tape re-engages said heads in its inverted relationship.

23. A tape recorder comprising a driving shaft rotating constantly in one direction defining a capstan, a tape take-up reel drive including a wheel having a V-groove in the peripheral edge of said wheel, a tread disposed in said V-groove under stretch tension, and being movable into pressure contact with said capstan about an axis remote from the axis of the capstan, said tension being great enough that pressure contact with said tread by said capstan fails to place any of the elastomer under compression, and releasable resilient means urging said wheel and capstan into rolling drive relationship, in which said axis of the capstan defines the apex of an obtuse angle of a triangle whose other corners are said remote axis and the axis of said wheel engaged, said capstan and wheel rotating in the direction of the triangle at their point of engagement to force said capstan into pressure contact with said tread.

References Cited by the Examiner

UNITED STATES PATENTS

| | | | |
|---|---|---|---|
| 2,898,055 | 8/1959 | Genning et al. | 242—55.12 |
| 2,951,914 | 9/1960 | Dubois | 242—55.13 X |

MERVIN STEIN, *Primary Examiner.*

STANLEY N. GILREATH, *Examiner.*

L. D. CHRISTIAN, *Assistant Examiner.*